(12) United States Patent
Trishaun

(10) Patent No.: US 10,732,121 B1
(45) Date of Patent: Aug. 4, 2020

(54) VISIBLE SPECTRUM SENSOR BEACON AND METHOD FOR REMOTE MONITORING

(71) Applicant: Marquette Trishaun, Orlando, FL (US)

(72) Inventor: Marquette Trishaun, Orlando, FL (US)

( * ) Notice: Subject to any disclaimer, the term of this patent is extended or adjusted under 35 U.S.C. 154(b) by 0 days.

(21) Appl. No.: 16/724,196

(22) Filed: Dec. 21, 2019

(51) Int. Cl.
*G01J 3/46* (2006.01)
*G01N 21/78* (2006.01)
*G01N 31/22* (2006.01)

(52) U.S. Cl.
CPC .............. *G01N 21/78* (2013.01); *G01N 31/22* (2013.01)

(58) Field of Classification Search
CPC ........ G01J 3/46; G01J 3/50; G01J 3/02; G01J 3/524; G01J 3/51
USPC ........................................................ 356/402
See application file for complete search history.

(56) References Cited

U.S. PATENT DOCUMENTS

| | | | |
|---|---|---|---|
| 9,080,985 B2 | 7/2015 | Stevenson et al. | |
| 2018/0268056 A1* | 9/2018 | Gharabegian | G11B 27/34 |
| 2018/0366976 A1* | 12/2018 | Kilburn | H04W 52/0216 |
| 2019/0345741 A1* | 11/2019 | Yates | E05B 67/003 |
| 2019/0358387 A1* | 11/2019 | Elbadry | A61B 5/4836 |

* cited by examiner

*Primary Examiner* — Md M Rahman
(74) *Attorney, Agent, or Firm* — Allen, Dyer, Doppelt + Gilchrist, PA

(57) ABSTRACT

An electronic device is for monitoring the visible spectrum of a specified sample with agile monitoring techniques. The device may seek to decouple the sensor from static measurements and allow for dynamic measurements in systems where the response is not wide sense stationary, allowing the end user to aggregate multiple data points or moments in summarizing the health of a larger system. In aquacultures, the device may be capable of functioning as a floating buoy where a chemical sensor with a color response can note readings at multiple points within a stream or water body.

20 Claims, 7 Drawing Sheets

VISIBLE SPECTRUM SENSOR BEACON AND METHOD FOR REMOTE MONITORING

CROSS REFERENCE TO RELATED APPLICATIONS

This application claims the benefit of priority to U.S. Provisional Application Ser. No. 62/784,186 filed Dec. 21, 2018, the entire disclosure of which is incorporated herein by specific reference thereto.

FIELD OF INVENTION

This invention relates to an electronic device for monitoring the visible spectrum of a specified sample by means and use of agile monitoring techniques. The said embodiments seek to decouple the sensor from static measurements and allow for dynamic measurements in systems where the response is not wide sense stationary allowing the end user to aggregate multiple data points or moments in summarizing the health of a larger system. More specifically in aquacultures the sensor shall be capable of functioning as a floating buoy wherein a chemical sensor with a color response can note readings at multiple points within a stream or water body. Said sensors in this space can be manufactured to react with color variation to critical factors like ammonia level, nitrate level, dissolved oxygen, PH, Conductivity, and even airborne toxins like carbon monoxide to name a few. The said sensor allows for remote monitoring of the color beacon by providing hooks into the internet of things (IoT) via cellular, WIFI, and other leading radio links. The software suite provides a framework in which municipalities can rapidly implement and verify various safety points of the aforementioned sensors in the digital transformation of legacy systems to include water treatment facilities, waste management, air quality control, and many other smart city initiatives.

BACKGROUND AND PRIOR ART

The current state-of-the-art consists of numerous sensors for water quality management in the form of solution test kits, point-of-sample meters with vials, along with other disclosures that outline digital reading of color reactive sensors. While it is obvious in today's arena that one can read said sensors with cameras and other optics, not all methods are obvious in implementing a sensor architecture that allows for remote monitoring and the aggregation of data from multiple reference points. We therefore seek to place more emphasis on the embodiment of sensors in a fashion that is amenable to wide sense real-time data acquisition along with important distinction in the flexibility to perform agile readings. Our embodiments will therefore provide novel approaches to performing multiple readings at different levels of a building per se, at different depths in a lake or stream, and via wayward control and dispatch as instrumented in autonomous platforms. Many prior attempts on remote patient monitoring systems allow limited patient location tracking or monitor only physiological data for use of healthcare officials. In the case of the latter, monitoring exclusively physiological data such as blood pressure or heart rate may not allow for reporting of events such as over exposure to sun light or the patient experiencing a fall. This results in emergency response not being received when most necessary.

SUMMARY OF THE INVENTION

The Agile Visible Spectrum Beacon provides a means for the end-user to remotely monitor the state of critical factor (s) such as, but not limited to: ammonia level, nitrate level, dissolved oxygen, PH, Conductivity, and even airborne toxins like carbon monoxide. This is accomplished by detecting the color of a chemically-reactive, reversible, color-changing compound affixed to the Agile Visible Spectrum Beacon. The state of the critical factors(s) is/are computed by the onboard firmware and then reported to the end-user via a wireless link. In contrast to most commercially available sensors and probes which require the end-user to be on-site and in, or in close proximity to, hazardous conditions (e.g. a carbon monoxide rich atmosphere) in order to determine the state of the system under surveillance.

The state of the aforementioned critical factors is ascertained in real-time using an on-board color-sensing Integrated Circuit (IC) and an illuminant, in the form of an on-board neutral white Light Emitting Diode (LED). This allows the Agile Visible Spectrum Beacon to accurately determine the color of the color-changing compound under a wide variety of ambient light conditions, including a completely dark environment.

The wireless link shall support Bluetooth Low Energy (BLE) communication protocol and other radios like SUB-1G and cellular (i.e. 5G). The chosen antenna and RF substrate are fully compatible with all competing lower-power standards/communication radios.

The Agile Visible Spectrum Beacon is powered by single, standard, commercially-available coin cell battery. The onboard firmware is optimized for minimal power consumption, allowing the Agile Visible Spectrum Beacon to be deployed for extended periods of time, in excess of the shelf-life of most chemically-reactive, color-changing agents. This is in contrast to most commercially-available chemically-reactive probes which cannot be exposed to the environment under test for extended periods of time without being removed for maintenance and/or re-conditioning.

The companion software application running on the remote, BLE-enabled device (e.g. smart phone, tablet, laptop, etc.) allows for a scalable framework of useful functions such as, but not limited to: customizable critical factor alert thresholds, customizable critical alert semaphores that can be raised on various communications channels (e.g. cellular SMS, Wi-Fi, etc.), low battery alerts, chemical compound expiration alerts, long-term critical factor data logging and analysis via IoT Cloud services, etc.

A network of multiple Agile Visible Spectrum Beacons can be deployed at various locations across a site, allowing for the remote monitoring of various points within a system whose critical factor(s) experience variations with respect to location. In contrast with similar technologies which involve invasive wired connections to be established throughout the site, the Agile Visible Spectrum Beacons affords the end-user increased surveilled coverage through a non-invasive, wireless link.

DETAILED DESCRIPTION

Figure 1:
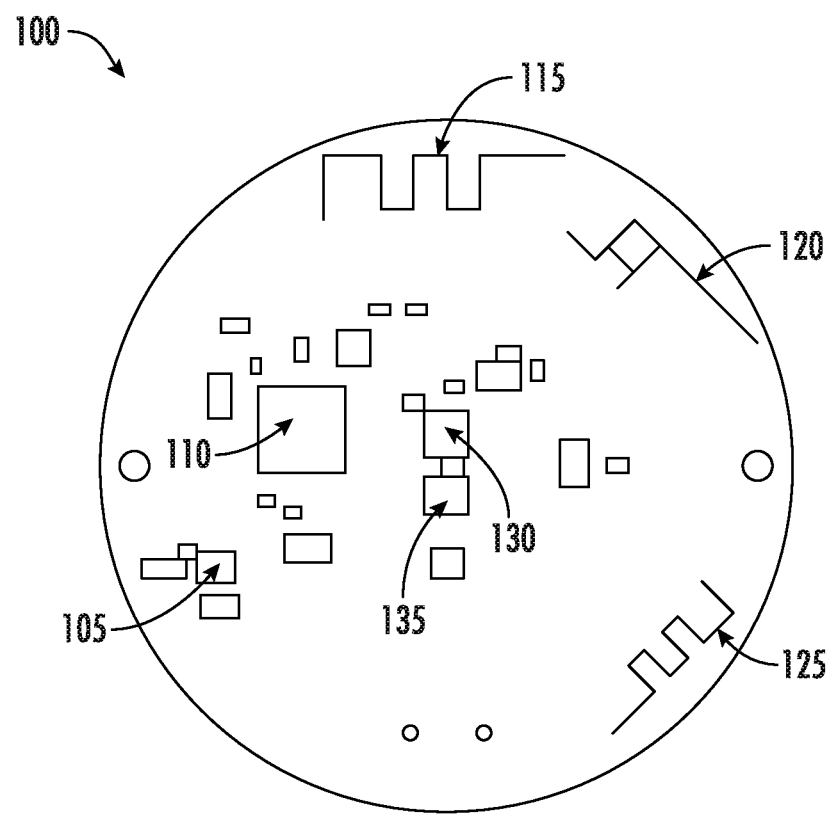
FIG. 1 details the Agile Visible Spectrum Beacon printed circuit board (PCB).
Figure 2:
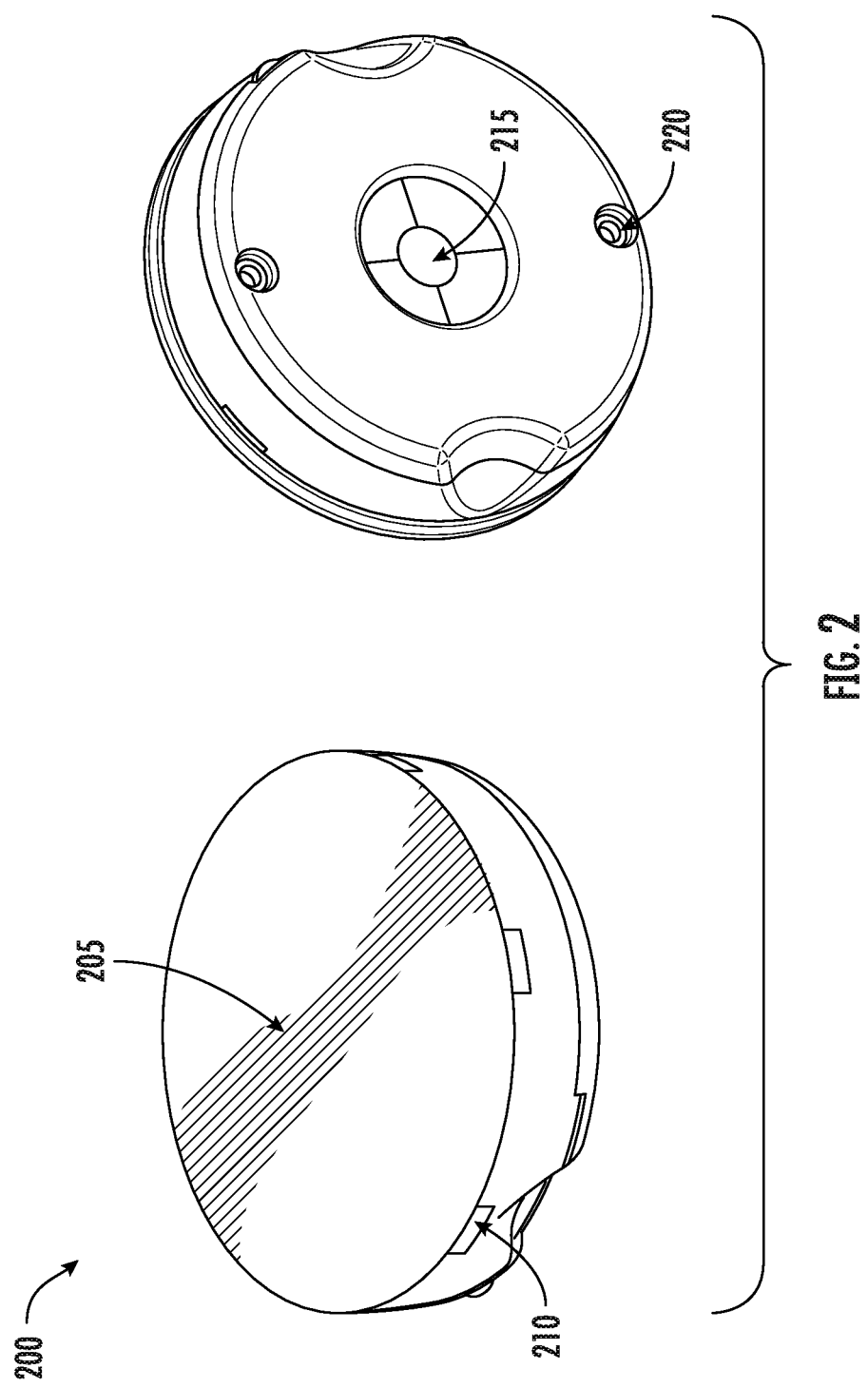
FIG. 2 details the Agile Visible Spectrum Beacon buoy enclosure.
Figure 3:
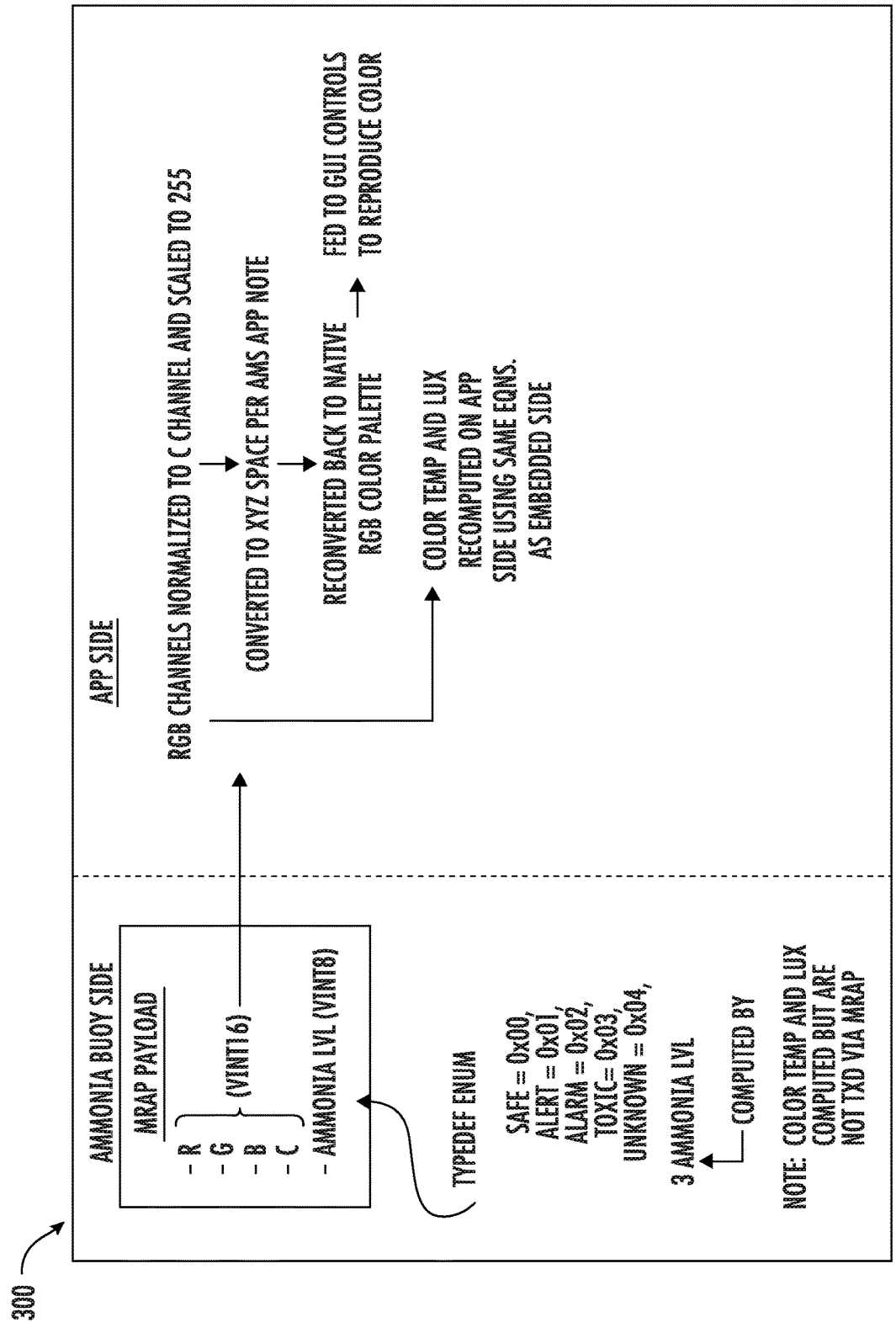
FIG. 3 details the Agile Visible Spectrum Beacon Wireless data protocol.
Figure 4:
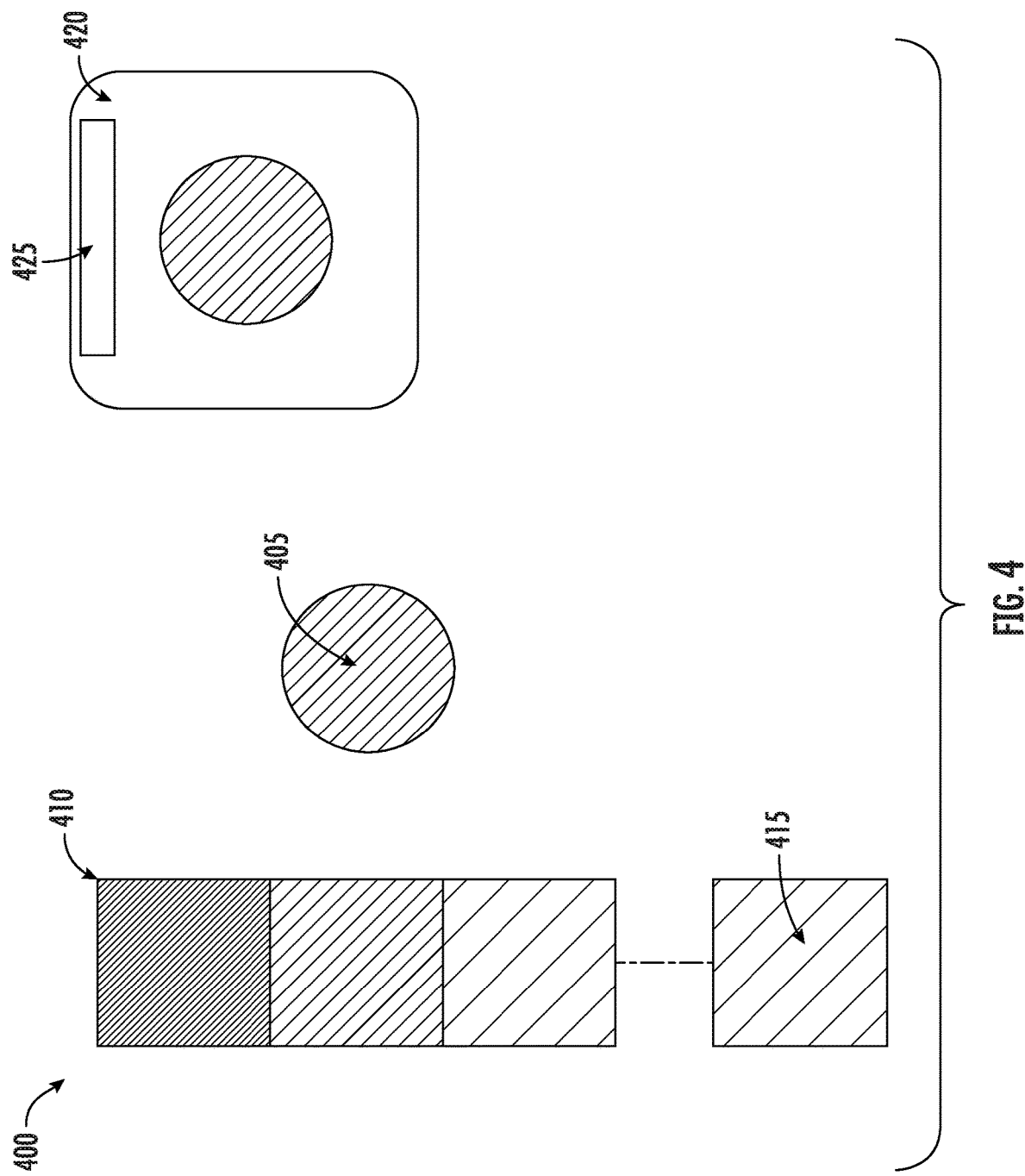
FIG. 4 details the Agile Visible Spectrum Beacon printed circuit board (PCB).
Figure 5:
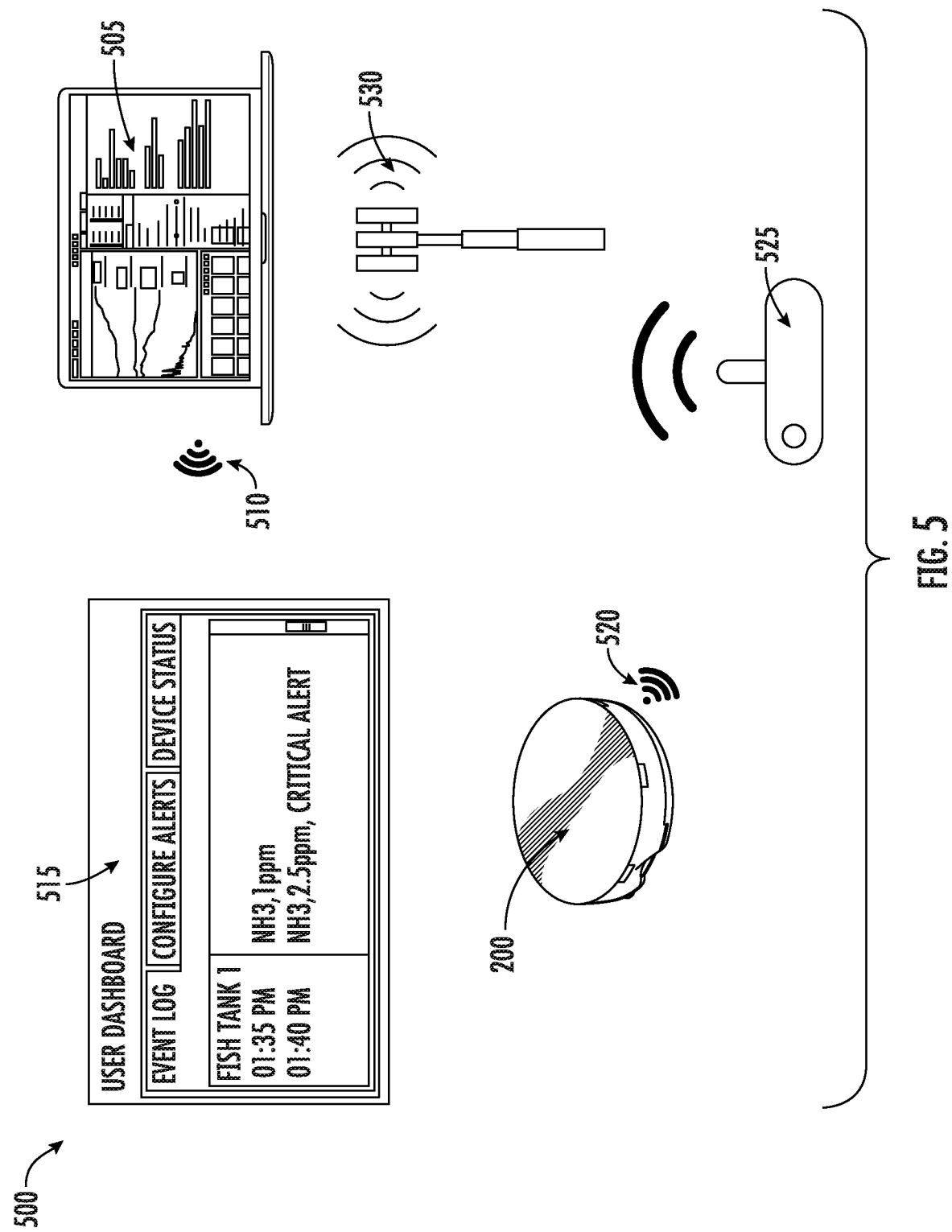
FIG. 5 details the Agile Visible Spectrum Internet-of-Things framework.
Figure 6:
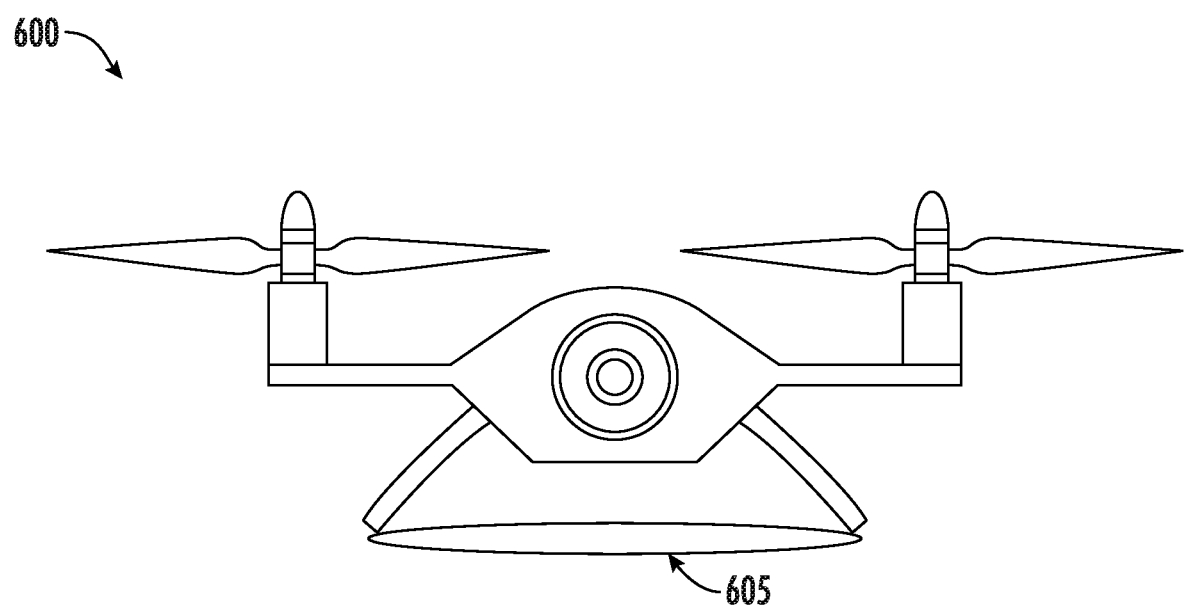
FIG. 6 details a generic Drone with mount to handle and deploy sensor.
Figure 7:
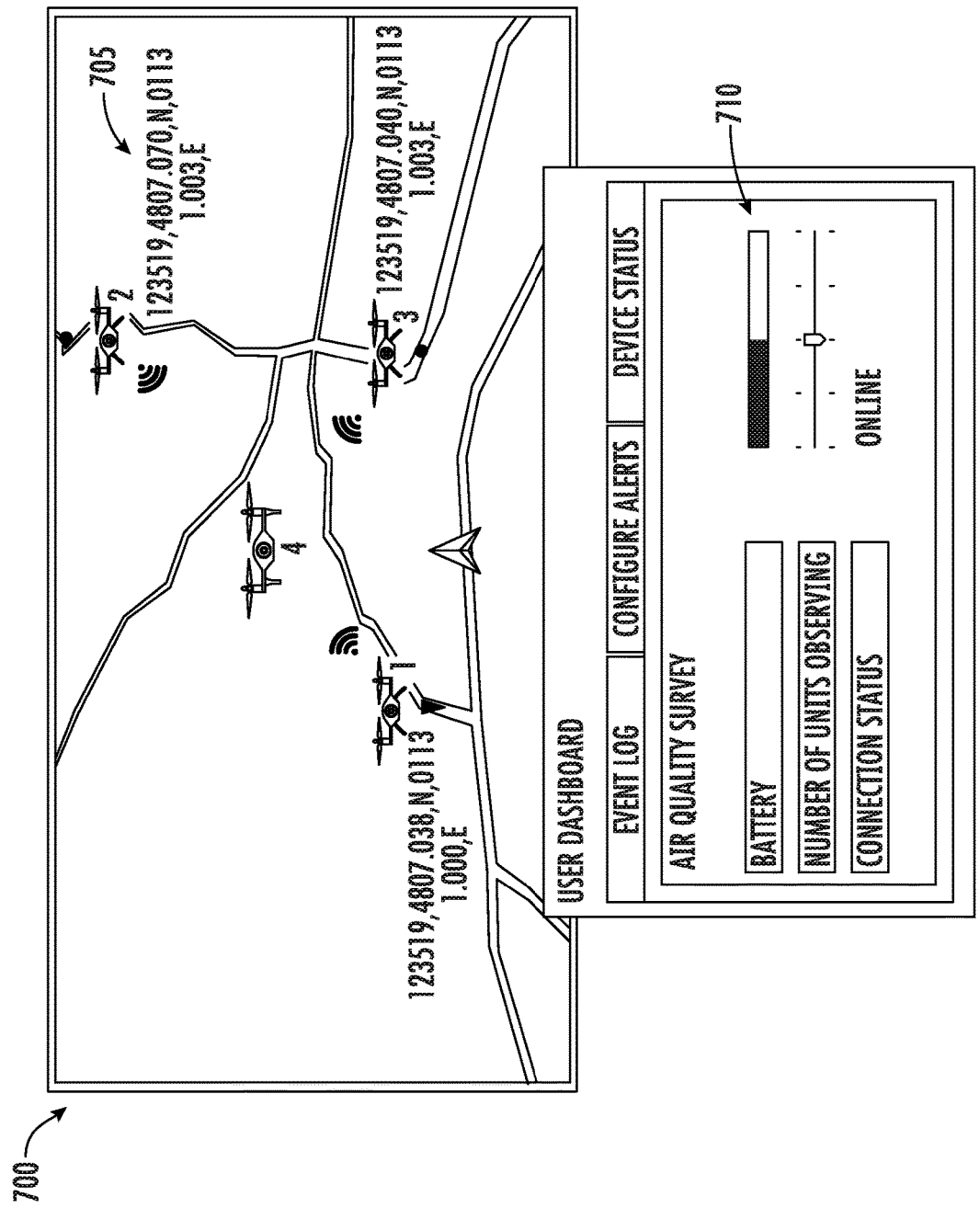
FIG. 7 details a generic Drone with mount to handle and deploy sensor.

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and base 100 reference numerals are used to indicate similar elements in alternative embodiments.

The Agile Visible Spectrum Beacon printed circuit board (100) contains an on-board, BLE-compliant RF microcontroller (MCU) (110) equipped with an on-board PCB antenna (115). The MCU interfaces with a co-located color sensor (135) via a digital, serial interface. The color-changing target is illuminated by the on-board, neutral white LED (130), enabling the color sensor to ascertain the color of the target in various lighting conditions, including low or no light environments. The PCB comes equipped with an on-board voltage-regulation circuit (105) to utilize the entire coin cell battery current capacity.

The Agile Visible Spectrum Beacon Buoy enclosure (205) is water-tight and naturally buoyant. The chemically-reactive, color-changing compound is located on a disposable card (215) which is secured against the color-sensing aperture of the board by the bottom half of the enclosure. The two halves of the enclosure are fastened together by screws (220). The Agile Visible Spectrum Beacon enclosure assembly can then be placed on the surface of the body of liquid whose critical factor(s) is/are being sensed by the color-changing compound. The liquid inlets (210) allow the outer chamber of the enclosure to equalize in density with the surrounding liquid, ensuring the color-changing compound is fully submersed throughout the measurement cycle.

The Agile Visible Spectrum Beacon Wireless Data Protocol (300) facilitates the transfer of data between the beacon and the remote, BLE-compliant device running the companion software using a low-energy, low-bandwidth, unidirectional wireless link. The color of the color-changing compound is reported as a union of Red, Green, Blue and Clear color channel readings generated by the onboard color sensor. Derived visible spectrum parameters such as color temperature, ambient light intensity, etc. are then computed from the aforementioned color channel data.

The software application layer is intended to device a color metric system (400) where a general color mapping interface (410) for mapping N number of colors (415) is mapped to a N number of numeric codes. The reactive color element (405) is capable of changing its color as a reaction to a number of agents designed or engineered by the individual user. Several manufacturers will distribute said color reactive sensors as mountable card (420) wherein the user interprets these changes in color to represent something via the naked eye. Said manufactures using this system can relay this via a meaningful software indicator removing the need to manually interpret the color. Said manufacturers can store off these profiles as pre built sensor cards (425) and therefor the user can plug and play and no longer be within the visual range of the sensor.

The SHSC implements the Critical Sub-system Failure Autonomous Recovery Routines (CSFARR) framework. CSFARR Is a collection of control-loops that will auto-execute in the event of a critical sub-system failure. These CSFARR control-loops will be auto-executed and take precedence over (e.g. suspend) the normal operational control-loop when a specified criterion is met such as, but not limited to: unexpected wireless link termination with main control board, unexpected wireless link termination with critical sub-system sensor, aquaponics parameter under observation exceeds operational bounds. Therefore, CSFARR framework behaves as a watchdog that will react to unexpected system conditions, perform corrective action outside the normal operational control-loop, notify the end-user via a wireless message (i.e. cellular text message, HTTP message, E-mail etc.), and if appropriate, restore the normal SHSC operational control loop. This added redundancy will help mitigate losses (i.e. fish population perishing, plants perishing, etc.) within the observed aquaponics system that would occur in the event of catastrophic failure(s) of electrical equipment operating within the SHSC framework. In addition to the preset CSFARR control loops, the user also has the ability to create and/or customize pre-existing CSFARR loops in order to better serve the end-user's unique chemical/gas sensing system implementation via the intuitive block-based GUI.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

That which is claimed is:

1. A system for monitoring a state of a visible color indicator, the system comprising:
    a housing comprising a sensor opening;
    a color reactive sensor carried by said housing to as to be exposed externally through the sensor opening, said color reactive sensor configured to sense at least one parameter, and generate at least one exhibited color for the sensed at least one parameter;
    a battery power source carried by said housing;
    an image sensor carried by said housing and coupled to said battery power source, said image sensor configured to generate a digital output for the at least one exhibited color; and
    at least one wireless transceiver carried by said housing and coupled to said battery power source;
    said at least one wireless transceiver configured to send an alert to a server when the at least one exhibited color exceeds a respective desired range.

2. The system of claim 1 further comprising a processor carried by said housing and coupled to said battery power source, said image sensor, and said at least one wireless transceiver, said processor configured to assign alerts and indicators as defined by user selectable parameters.

3. The system of claim 2 wherein the at least one parameter comprises a presence of chemical.

4. The system of claim 2 wherein said image sensor is configured to periodically generate the digital output for the at least one exhibited color at a user-selected frequency.

5. The system of claim 1 further comprising a light source configured to illuminate said color reactive sensor.

6. The system of claim 1 wherein said housing includes an outer chamber, and a plurality of openings fluidly coupled to said outer chamber.

7. The system of claim 1 wherein said color reactive sensor is configured to sense a plurality of parameters, and generate a plurality of exhibited colors for the sensed plurality of parameters.

8. The system of claim 7 further comprising a processor carried by said housing and coupled to said battery power source, said image sensor, and said at least one wireless transceiver, said processor configured to map the plurality of exhibited colors onto a plurality of numeric codes for transmission via said at least one wireless transceiver.

9. The system of claim 1 wherein said housing comprises a disc-shaped housing.

10. The system of claim 1 wherein said housing comprises a water-proof housing for said battery power source, said image sensor, and said at least one wireless transceiver.

11. A system comprising:
a server; and
a device for monitoring a state of a visible color indicator, said device comprising
a housing comprising a sensor opening,
a color reactive sensor carried by said housing to as to be exposed externally through the sensor opening, said color reactive sensor configured to sense at least one parameter, and generate at least one exhibited color for the sensed at least one parameter,
a battery power source carried by said housing,
an image sensor carried by said housing and coupled to said battery power source, said image sensor configured to generate a digital output for the at least one exhibited color, and
at least one wireless transceiver carried by said housing and coupled to said battery power source,
said at least one wireless transceiver configured to send an alert to said server when the at least one exhibited color exceeds a respective desired range.

12. The system of claim 11 wherein said device further comprises a processor carried by said housing and coupled to said battery power source, said image sensor, and said at least one wireless transceiver, said processor configured to assign alerts and indicators as defined by user selectable parameters.

13. The system of claim 12 wherein the at least one parameter comprises a presence of chemical.

14. The system of claim 12 wherein said image sensor is configured to periodically generate the digital output for the at least one exhibited color at a user-selected frequency.

15. The system of claim 11 wherein said device further comprises a light source configured to illuminate said color reactive sensor.

16. The system of claim 11 wherein said housing includes an outer chamber, and a plurality of openings fluidly coupled to said outer chamber.

17. The system of claim 11 wherein said color reactive sensor is configured to sense a plurality of parameters, and generate a plurality of exhibited colors for the sensed plurality of parameters.

18. The system of claim 17 wherein said device further comprises a processor carried by said housing and coupled to said battery power source, said image sensor, and said at least one wireless transceiver, said processor configured to map the plurality of exhibited colors onto a plurality of numeric codes for transmission via said at least one wireless transceiver.

19. The system of claim 11 wherein said housing comprises a disc-shaped housing.

20. The system of claim 11 wherein said housing comprises a water-proof housing for said battery power source, said image sensor, and said at least one wireless transceiver.

* * * * *